United States Patent [19]

Thornton-Trump

[11] Patent Number: 4,648,366
[45] Date of Patent: Mar. 10, 1987

[54] VEHICLE SPEED CONTROL DEVICE

[76] Inventor: Walter E. Thornton-Trump, P.O. Drawer 308, Elberta, Ala. 36530

[21] Appl. No.: 730,992

[22] Filed: May 6, 1985

[51] Int. Cl.$^4$ .......................... B60K 31/00; F02P 9/00
[52] U.S. Cl. .................................. 123/335; 123/353; 180/170; 180/333
[58] Field of Search ....................... 123/335, 334, 353; 180/170, 333, 176, 179

[56] References Cited

U.S. PATENT DOCUMENTS

| 3,356,082 | 12/1967 | Jukes | 123/335 |
| 3,563,219 | 2/1971 | Mieras | 123/335 |
| 3,630,304 | 12/1971 | Sahinkaya | 180/105 E |
| 3,651,793 | 3/1972 | Roth et al. | 123/335 |
| 3,705,639 | 12/1972 | Colling et al. | 180/176 |
| 3,738,340 | 6/1973 | Olson | 123/335 |
| 3,789,810 | 2/1974 | Sattler | 123/335 |
| 3,884,203 | 5/1975 | Cliffgard | 123/335 |
| 3,891,046 | 6/1975 | Oicles | 180/105 E |
| 4,078,631 | 3/1978 | Kadota et al. | 123/335 |
| 4,155,340 | 5/1979 | Fernquist et al. | 123/617 |
| 4,171,687 | 10/1979 | Coventry | 123/198 DC |
| 4,374,422 | 2/1983 | O'Keefe, Jr. et al. | 364/426 |

Primary Examiner—Andrew M. Dolinar
Attorney, Agent, or Firm—Welsh & Katz, Ltd.

[57] ABSTRACT

A system for automatically limiting the maximum speed of a vehicle to a predetermined maximum, particularly suitable for use with off-road vehicles such as aircraft deicing trucks. The system utilizes a magnetic Hall effect sensor to generate a speed signal which is compared to a signal representative of a preselected maximum vehicle speed. In response to the comparison a pulse-width modulated control signal is generated and used to control a transistor in series with the ignition coil primary thereby intermittently disrupting the ignition system.

16 Claims, 2 Drawing Figures

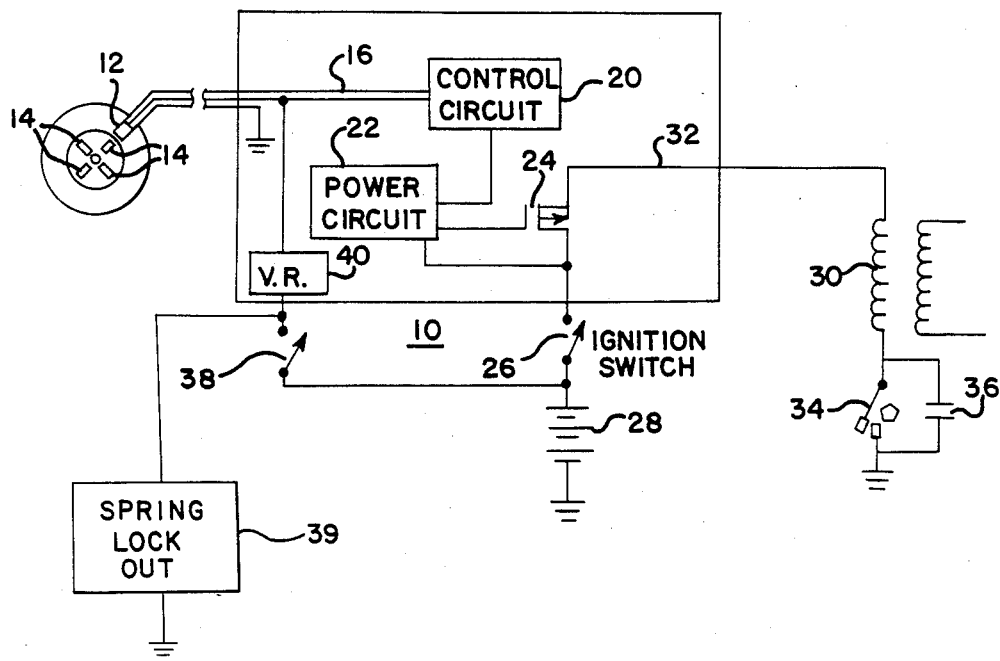

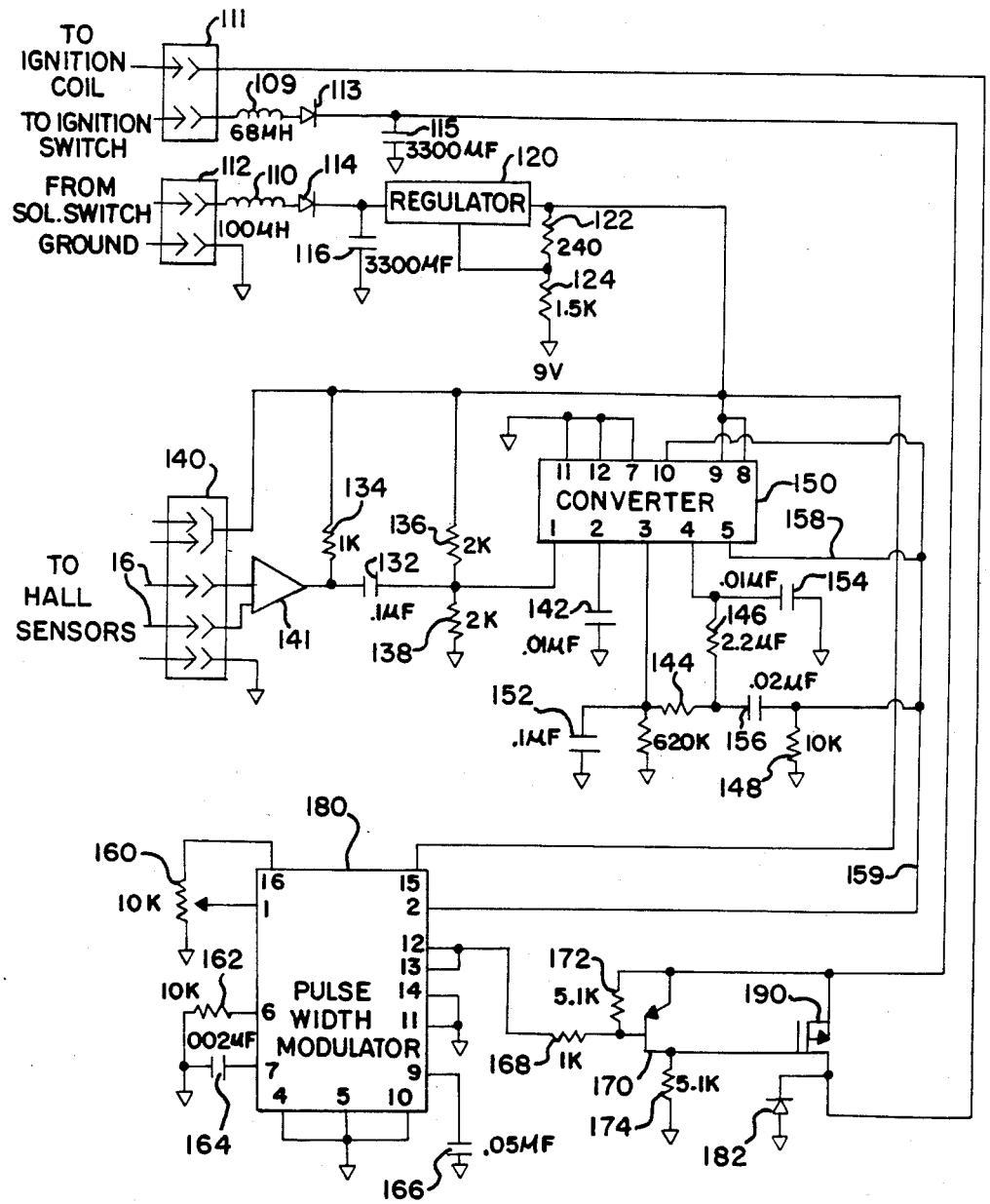

VEHICLE SPEED CONTROL DEVICE

This invention relates generally to automatic speed control systems for vehicles and is more particularly directed to a system for limiting the speed of vehicles powered by internal combustion engines having spark ignition in off-road applications where a low speed is required.

In many conditions in which vehicles are utilized, it is desirable to prevent the vehicle from exceeding a predetermined speed for safety reasons, among other reasons. For example, vehicles which are used in close proximity to large aircraft for such purposes as refueling and deicing would constitute an unreasonable hazard if allowed to exceed a safe speed. Thus, it is desirable to provide means to automatically prevent these vehicles from exceeding a safe speed.

Many automatic speed controls have been developed for use by a wide variety of vehicles. Most are of a type commonly termed "cruise controls" which maintain a desired speed compensating for variations in driving conditions such as wind, rain, and road surface conditions. These are clearly unsuitable for speed limitation purposes.

Another type of speed control, commonly known as a "governor", controls engine speed or limits the engine throttle. However, in many circumstances speed limited vehicles must have full engine power available to be able to overcome sudden inclines, ruts, snow, ice, etc., and to power auxiliary equipment functions unrelated to vehicle speed. Such is the case with respect to aircraft deicing vehicles. Systems which limit the engine speed or throttle are clearly unsuitable in these situations.

Accordingly, it is an object of the present invention to provide an improved vehicle control system which limits vehicle speed by interrupting the ignition when the vehicle speed exceeds a predetermined value.

It is another object of the invention to provide an improved speed control system which magnetically senses the rotational speed of the vehicle wheels and intermittingly interrupts the engine ignition when the rotational speed approaches or exceeds a predetermined speed limit.

Briefly, according to one embodiment of the invention, an apparatus is provided for automatically limiting the speed of a vehicle powered by an internal combustion engine having a spark ignition system. The apparatus comprises sensor means for generating a speed signal responsive to the speed of the vehicle having a pulse repetition frequency proportional to the speed of the vehicle, as well as means for comparing the vehicle speed to a preselected speed and for generating a control signal in response to the relationship between the vehicle speed and the preselected speed. In addition, the apparatus comprises power means for intermittingly interrupting the ignition system responsive to the control signal.

BRIEF DESCRIPTION OF THE DRAWINGS

The invention, together with further objects and advantages thereof may be understood by reference to the following description taken in conjunction with the accompanying drawings.

FIG. 1 is a generalized block diagram illustrating a specific embodiment of an automatic vehicle speed limiting apparatus of the present invention.

FIG. 2 is a detailed schematic diagram of the electronics of the system illustrated in FIG. 1.

DETAILED DESCRIPTION OF PREFERRED EMBODIMENT

A specific embodiment of the automatic vehicle speed control system of the present invention, indicated generally at 10, is illustrated in FIG. 1 in generalized block diagram form. The system 10 shown is particularly suitable for use with aircraft deicing vehicles. The system 10 utilizes speed signals generated by a magnetic sensor 12 (e.g., a Hall sensor in the illustrated embodiment) mounted in proximity to a member of the vehicle which has a motion that is proportional to the speed of the vehicle. For example, the drive shaft, speedometer cable, axle, or wheel of the vehicle each rotate at a rate proportional to the speed of the vehicle. In conditions in which the vehicle must operate on rutted or icy surfaces at slow speeds where slippage can occur, sensing the speed of a non-drive wheel may be preferable. In addition, where great accuracy is required, as well as lack of slippage, it is sometimes preferable to mount speed sensors on non-drive wheels on each side of the vehicle thereby obtaining an average speed to provide an accurate measurement of vehicle speed even when turning.

In the illustrated embodiment, four magnets 14 are mounted on a drive wheel of the vehicle, as shown. The drive shaft or speedometer cable are also highly suitable locations for the magnetic sensors. As the wheel rotates, the magnets 14 pass close to the sensor 12 causing a signal pulse to be generated, thereby producing a speed signal comprising a repeating train of pulses having a repetition rate proportional to the rate of rotation of the wheel and thus proportional to the speed of the vehicle. The speed signal from the sensor 12 is coupled via a conductor 16 to a control circuit 20, as shown. The control circuit 20 converts the pulses of the speed signal into a DC voltage proportional to the repetition rate of the pulses and consequently proportional to the vehicle speed. This resultant DC voltage is compared to a preset voltage representative of a predetermined upper limit on the vehicle speed and a pulse-width modulated control signal is generated with the duty cycle of the control signal decreasing as the vehicle speed approaches the preset speed. This pulse-width modulated control signal is coupled to a power circuit 22 which controls a power control device 24 which in the illustrated embodiment is a metal oxide semiconductor field effect transistor (MOSFET).

The power circuit maintains the control transistor 24 in the "on" or closed condition whenever the control signal from the control circuit 20 is not being generated. In addition, the power circuit couples the pulse-width modulated signal to the control transistor 24. The drain of the transistor 24 is coupled as shown to the ignition switch 26 of the vehicle which in the "on" or closed position couples the vehicle battery 28 to the drain of the transistor 24. The source of the transistor 24 is coupled via a conductor 32 to one end of the primary of the vehicle ignition coil 30. The other end of the ignition coil primary 30 is coupled as shown to the ignition system points 34 including a capacitor 36, which points and capacitor are coupled at the other end to ground. As a result, when the ignition switch is on, the transistor 24 controls the voltage applied to the primary of the ignition coil, thereby controlling the ignition of the vehicle. When the transistor 24 has a control signal applied which is pulse-width modulated, the ignition system is intermittingly disabled.

In addition, a power switch 38 is coupled from the vehicle battery 28 to a voltage regulator 40, as shown. When the switch 38 is closed, power is applied to the voltage regulator 40 which generates, in the illustrated embodiment, a voltage of 9 volts, which is coupled as shown to provide power to the control circuit 20 and the Hall effect sensor 12. The power switch 38 is activated when a spring lock out mechanism 39 is activated by the vehicle operator. The spring lock out mechanism is a hydraulically activated cylinder which locks the rear chassis of the vehicle to the suspension, defeating the suspension springs and thereby giving more stability when the vehicle is being used for aircraft deicing. This feature of the vehicle is provided because a large boom is used in the deicing procedure which requires greater stability than would be provided if the suspension springs were not deactivated. Thus, when the hydraulic spring lock out system is energized, the power switch 38 is closed, thereby activating the speed control system 10.

Referring now to FIG. 2, there is shown a detailed schematic diagram including typical component values showing a specific embodiment of the circuitry illustrated in FIG. 1. It should be noted that FIG. 2 is only one of many possible circuit configurations and that the component values shown are provided as examples only.

The power switch 38 of FIG. 1 is connected to an inductor 110 of FIG. 2 via a connector 112. Thus, when the switch 38 is closed, 12 volts from the vehicle battery is coupled through inductor 110 and a diode 114 to an adjustable voltage regulator 120 (e.g. A National LM317T). The diode 114 provides protection against negative voltage spikes and against damage due to reverse hook up of the circuit. The combination of the inductor 110 and a capacitor 116 form a spike filter to provide additional protection against voltage spikes. The voltage regulator 120 is a regulator having an adjustable output by means of a resistor network of resistors 122, 124 which have been chosen in the illustrated embodiment to provide a regulated 9 volt output. This 9 volt output provides power, as shown, to a frequency to voltage converter circuit 150 and pulse-width modulated regulator circuit 180, as well as providing bias voltage to the Hall effect sensor 112 of FIG. 1 via a connector 140.

The connector 140 also couples the speed signals from the Hall sensor 12 of FIG. 1 on conductor 16 through a capacitor 132 to the convertor circuit 150. The current may include a summing buffer 141 for adding signals from multiple sensors when more than one sensor is utilized for high accuracy situations as described hereinabove. Once added, a single signal comprised of a train of the pulses generated by all the sensors (preferably the magnets should be placed so that pulses are seldom generated simultaneously) is coupled through the capacitr 132. A pullup resistor 134 and bias resistors 136, 138 are provided, as shown. The speed signal is a train of pulses having a frequency of repetition which is proportional to the speed of the vehicle.

The speed signal is converted to a DC voltage proportional to the speed of the vehicle by the frequency to voltage convertor 150 which is configured with external components in the conventional manner. A capacitor 142 functions as an integrator in conjunction with the internal charge pump of the frequency to voltage convertor 150. In addition, a filter comprised of resistors 144, 146, 148 and capacitors 152, 154, 156 configured as shown, provides low pass loading of the output to filter out switching noise. A conductor 158 coupled to pin 5 provides negative feedback to the frequency to voltage convertor 150. The DC output voltage of the frequency voltage convertor 150 is coupled from pin 10 via a conductor 159 to the input (pin 2) of the pulse-width modulated switching regulator circuit 180 (e.g., an RCA CA3524).

The pulse-width modulating circuit 180 compares the DC voltage from the frequency to voltage convertor 150 to a preset reference voltage determined by the setting of a potentiometer 160. The setting of the potentiometer 160 is representative of the desired maximum voltage speed. The output of the pulse-width modulated circuit 180 at pins 12 and 13 is normally high whenever the input DC voltage is substantially below the preset reference voltage. As the input DC voltage approaches the preset reference voltage, the output of the pulse-width modulating circuit 180 is chopped at a frequency determined by a resistor 162 and a capacitor 164 coupled as shown to pins 6 and 7. In the illustrated embodiment, this frequency is approximately 2 kilohertz; however, a wide range of frequencies can be suitable, including frequencies ranging from below 20 hertz to above 2 kilohertz. The duty cycle of the chopped output is decreased as the DC input voltage approaches the reference voltage until the output becomes continuously low when the reference and the DC input voltage are equal. As an alternative, the circuit component values can be chosen to maintain a minimum duty cycle of approximately 5% in order to reduce the probability of killing the engine. A capacitor 166 provides compensation in the feedback loop of the internal error amplifier of the pulse-width modulating circuit 180.

The output signal from the pulse-width modulating circuit 180 is coupled from the output (pins 12 and 13) through a resistor 168 to the base of a bipolar control transistor 170 (e.g. a 2N3906), as shown. Resistors 172, 174 form a bias network with the transistor 170, which bias network maintains the transistor 170 in the off state when the ignition switch is on and the control circuitry is off (i.e., when there is no voltage through the regulator 120 due to an open power switch 38). This insures that the ignition will function when the speed control circuit 10 is not enabled. In addition, when the control signal from the pulse-width modulating circuit 180 is high, the transistor 170 is off, and when the control signal goes low, the transistor 170 is on.

The collector of the transistor 170 is coupled to and controls a p-channel, enhancement mode, VMOSFET190 (e.g., an International Rectifier IRS9130), as shown. The vehicle battery voltage is coupled through a connector 111 and through a reverse voltage protected spike filter made up on an inductor 109, a capacitor 115 and a diode 113 to the drain of the transistor 190, as shown. The source of the transistor 190 is coupled to the primary of the vehicle ignition coil such that the transistor 190 acts as a series switch. Thus, the MOSFET190 serves as the power control device, allowing the ignition to function normally when on and interrupting the ignition when off. A diode 182 coupled to the drain of the MOSFET190 provides additional voltage spike protection.

In operation, when the transistor 170 is turned off, its collector is low, turning on the MOSFET190. Thus, the MOSFET190 is turned on, enabling the ignition, whenever the speed control circuit is disabled, or whenever the speed control circuit is enabled and the output from the pulse-width modulating circuit 180 is high. However, whenever the output of the pulse-width modulating circuit 180 is chopped, producing intermittent lows, the transistor 190 is intermittently turned on, which intermittently turns off the MOSFET190, thereby intermittently disabling the ignition. This intermittent disabling of the ignition slows the vehicle and prevents the engine from accelerating the vehicle to speeds beyond the preset speed limit.

A specific embodiment of the novel speed control system has been described for purposes of illustrating the manner in which the invention may be made and used. It should be understood that implementation of other variations and modifications of the invention in its various aspects will be apparent to those skilled in the art and that the invention is not limited by the specific embodiments described. It is therefore contemplated to cover by the present invention any and all modifications, variations or equivalent that fall within the true spirit and scope of the basic underlying principals disclosed and claimed herein.

What is claimed is:

1. Apparatus for automatically limiting the speed of a vehicle powered by an internal combustion engine having a spark ignition system with an ignition coil, comprising:

sensor means for generating a speed signal directly representative of the speed of the vehicle comprising a series of speed signal pulses having a pulse repetition frequency proportional to the speed of the vehicle;

control means for converting speed signal pulses into a DC voltage proportional to the vehicle speed, means for comparing the DC voltage to a predetermined DC voltage having substantially zero AC components representative of a predetermined maximum speed and for generating a difference signal in response thereto, and means for generating a pulse-width modulated control signal responsive to the difference signal;

power means responsive to the control signal for intermittently interrupting the ignition system.

2. The apparatus of claim 1 wherein the sensor means comprises a magnetic field sensor and at least one magnet mounted in proximity to the magnetic field sensor and upon a member of the vehicle which rotates at a speed representative of the speed of the vehicle thereby producing speed signal pulses having a pulse repetition frequency proportional to the speed of the vehicle.

3. The apparatus of claim 1 wherein the power means comprises a series control device in series with the ignition coil which is gated responsive to the pulse-width modulated signal for disrupting ignition when gated off and allowing normal ignition operation when gated on thereby slowing down the engine when the vehicle speed approaches the predetermined maximum speed.

4. The apparatus of claim 3 further comprising a power supply means for providing a regulated and filtered supply voltage to the control means and the sensor means.

5. The apparatus of claim 4 further comprising a switch means for disabling the power supply means and a bias means for maintaining the series control device in an on condition whenever the power supply means is disabled.

6. The apparatus of claim 3 wherein the series control device is a MOSFET.

7. The apparatus of claim 2 wherein the sensor means comprises a magnetic field sensor and at least one magnet mounted in proximity to the magnetic field sensor and upon a non-drive wheel of the vehicle.

8. The apparatus of claim 1 wherein the sensor means comprises a plurality of magnetic field sensors, at least one sensor located in proximity to each of two wheels located on opposite sides of the vehicle and at least one magnet mounted on each wheel, each sensor thereby producing a speed signal having a pulse repetition frequency proportional to the speed of the rotation of the respective wheel and further comprising buffer means for adding the speed signals from the magnetic field sensors to produce a signal proportional to the speed of the vehicle.

9. The apparatus of claim 1 wherein the means for generating the pulse-width modulated signal further comprises means for limiting the duty cycle of the pulse-width modulator signal to a predetermined non-zero minimum.

10. The apparatus of claim 1 wherein the vehicle includes a shock absorbing suspension system, the apparatus further comprising a suspension lockout means for disabling the suspension system when activated and disabling the speed control apparatus whenever the suspension lockout means is not activated.

11. The apparatus of claim 2 wherein the magnetic field sensor is a Hall effect sensor.

12. Apparatus for automatically interrupting the ignition system of a vehicle powered by an internal combustion engine having a spark ignition system with an ignition coil, comprising:

sensor means for generating a series of speed signal pulses having a repetition frequency proportional to a member of the vehicle with motion directly related to at least one of the engine rotation speed and the vehicle speed;

control means for converting the speed signal pulses into a DC voltage, for comparing the DC voltage to a predetermined DC voltage and for generating a difference signal in response thereto;

means for generating a pulse-width modulated signal responsive to the difference signal;

a series control device in series with the ignition coil which is gated responsive to the pulse-width modulated signal for disrupting ignition when gated off and allowing normal ignition operation when gated on;

power supply means for providing a supply voltage to the control means;

switch means for disabling the power supply means; and bias means for maintaining the series control device in an on condition whenever the power supply means is disabled.

13. The apparatus of claim 12 wherein the speed sensor means senses the speed of rotation of the speedometer cable.

14. The apparatus of claim 12 wherein the sensor means senses the speed of vehicle drive shaft.

15. Apparatus for automatically limiting the speed of rotation of selected wheels of a vehicle powered by an internal combustion engine having a spark ignition system, comprising:

sensor means for generating a speed signal responsive to the speed of rotation of the selected wheels of the vehicle wherein said sensor comprises a plurality of magnetic field sensors, at least one sensor located in proximity to each of two selected wheels located on opposite sides of the vehicle and at least one magnet mounted on each wheel, each sensor thereby producing sensor signal pulses having a pulse repetition frequency proportional to the speed of rotation of the respective wheel;

buffer means for adding the sensor signal pulses from the magnetic sensors to produce a speed signal proportional to the average speed of rotation of the two selected wheels;

control means, responsive to the speed signal, for comparing the average speed of rotation of the two selected wheels to a predetermine maximum speed of rotation and for generating a control signal in response thereto;

power means responsive to the control signal for intermittently interrupting the ignition system.

16. Apparatus for automatically limiting the engine rotation speed responsive to the speed of rotation of at least one selected member of a vehicle powered by an internal combustion engine having a spark ignition system, wherein the vehicle includes a shock absorbing suspension system, the apparatus comprising:

sensor means for generating a speed signal representative of the speed of rotation of at least one selected member of the vehicle, said speed signal comprising a series of speed signal pulses having a pulse repetition frequency proportional to the speed of rotation of the selected member;

control means, responsive to the speed signals pulses, for comparing the speed of rotation of the selected member to a predetermined maximum speed of rotation and for generating a control signal in response thereto;

power means responsive to the control signal for intermittently interrupting the ignition system;

suspension lockout means for disabling the suspension system when activated and for disabling the speed control apparatus whenever the suspension lockout means is not activated.

* * * * *